INVENTORS
ANTONIO PALLAGROSI
EUGENIO PALLAGROSI

BY Karl G. Ross

ATTORNEY

Oct. 21, 1969    A. PALLAGROSI ET AL    3,473,583
MACHINE FOR SQUARING PLATES OR PANELS OF WOOD, PLASTIC MATERIAL
OR THE LIKE, IN COMBINATION WITH A MULTIPLE DRILLING MACHINE
Filed Aug. 25, 1967    3 Sheets-Sheet 2
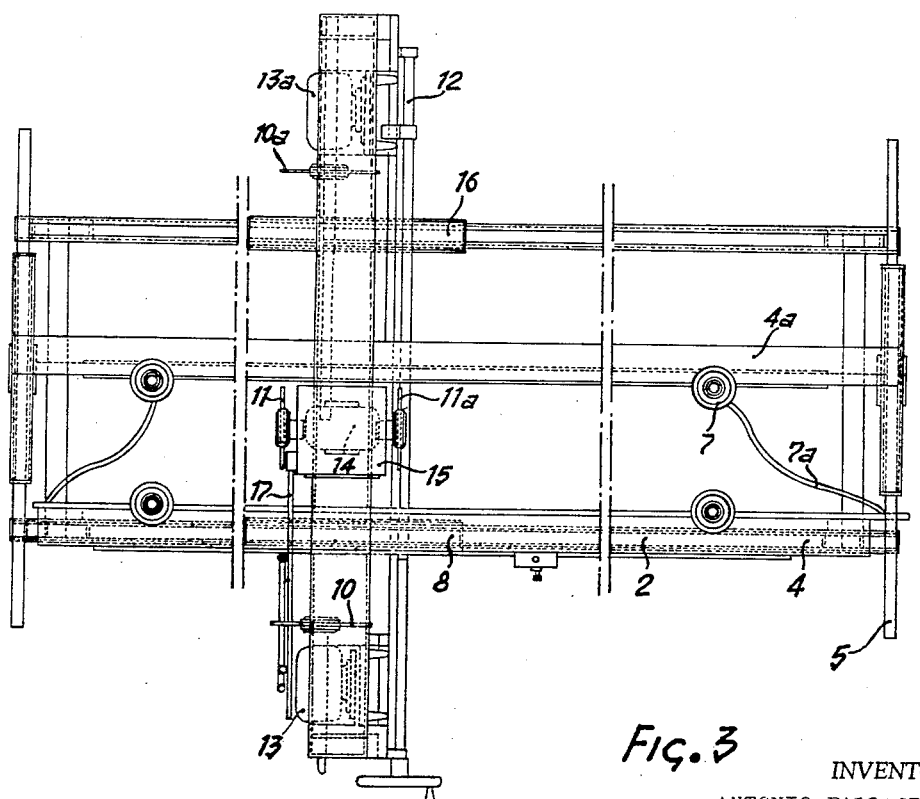
INVENTORS:
ANTONIO PALLAGROSI
EUGENIO PALLAGROSI
BY    Karl F. Ross
ATTORNEY

INVENTORS:
ANTONIO PALLAGROSI
EUGENIO PALLAGROSI

3,473,583
MACHINE FOR SQUARING PLATES OR PANELS OF WOOD, PLASTIC MATERIAL OR THE LIKE, IN COMBINATION WITH A MULTIPLE DRILLING MACHINE
Antonio Pallagrosi and Eugenio Pallagrosi, Sora, Italy, assignors to Fratelli Pallagrosi—S.N.C., Sora, Italy, a corporation of Italy
Filed Aug. 25, 1967, Ser. No. 663,257
Claims priority, application Italy, Aug. 27, 1966, 38/320; July 24, 1967, 38,881-A/67
Int. Cl. B27b 5/06
U.S. Cl. 144—35                                                                          6 Claims

ABSTRACT OF THE DISCLOSURE

A machine for squaring panels in which the portal frame having a crosspiece bridging a pair of uprights is longitudinally shiftable along a support frame with relatively shiftable longitudinal beams between which a suction arrangement clamps the panel, the uprights carrying vertical racks at the bottom of which a boring bar is angularly positionable. A power takeoff connection is provided through a hollow pivot pin at one end of the bar to drive the spindles while an indexing and locking device sets the angular position of the bar. The frame-carries a transverse set of vertical saw blades while a further pair of saw blades lies outwardly of the support frame.

---

Figure 1:
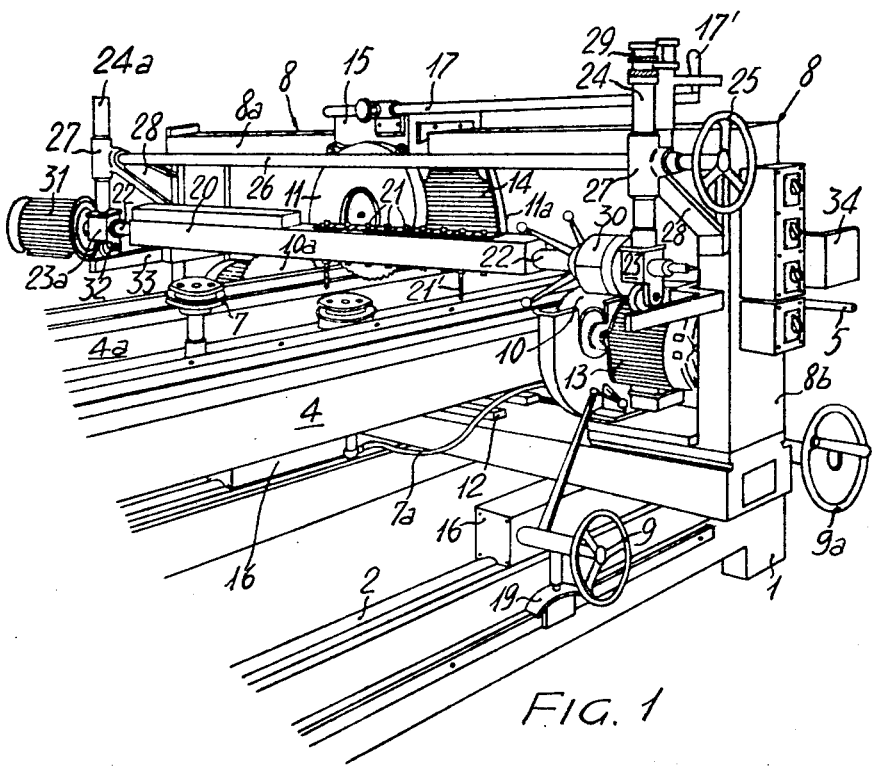

This invention relates to a machine for squaring plates or panels of wood, plastic material or the like, on all of the four sides thereof, so as to ensure the accurate perpendicularity of the sides, as well as the accomplishment on the workpiece itself and by a single positioning operation of all the vertical and horizontal bores for housing the reference and fastening spokes.

Heretofore, for squaring and drilling pltaes or panels of wood, plastic material or the like, machines have been utilized by which the cutting for the pairs of parallel sides is carried out through a single cutting or shearing apparatus operating only in one direction, so that after having cut one pair of parallel sides, the cutting for the second pair of sides at right angles to the former could be effected by rotating the workpiece through an angle of 90° on the work table, which involves a loss of time and the risk that the angles forming the two pairs of sides may be something other than 90° if, upon rotation, the workpiece will not be indexed with the greatest accuracy.

As a result, such a solution would require comparatively bulky machines, since the work table should have its two dimensions not less than the greatest dimension of the plates to be worked. In addition to the loss of time and labor required for rotating the plate and the risk of obtaining imperfectly squared pieces, the spacing or setting of the work tools must also be altered in order to pass from the cut for the pair of the longer sides to that of the shorter sides, or conversely.

It is an object of the invention to provide an improved apparatus for the squaring of panels and the like.

In the machine according to the invention the plate to be cut is kept, on the contrary, at a fixed position during the entire operation, whereas a sliding frame moves therealong longitudinally of the machine, said frame carrying two pairs of vertical rotating blades, which pairs are at right angles to each other, one of them being intended to effect longitudinal cuts, while the other is intended to effect transverse cuts. The first pair also comprises means for varying the distance between the two blades, which allows the simultaneous cutting of the longitudinal sides even while altering the width of the piece to be squared.

Therefore, such a machine will be of minimized overall dimensions with respect to known machines for squaring panels, since only the length thereof is determined by the maximum length of the plates to be worked, whereas the width is proportioned to the maximum expected width of the plates and not to the most unfavorable dimension, as in the past.

This invention also solves the problems involving support of the workpiece by making use of transversely moving beams, so that the plate edges are always free and within the reach of the tools, this being accomplished by clamping the plate through a pneumatic system of vacuum-operating valves adjustable as to height and position, so that plate or panel positioning will be very ready and accurate.

As the combined multiple drilling bar according to the invention is rotatable about its horizontal axis and capable of being moved upward or downward, forward or backward, it will allow the making of vertical and horizontal bores for housing the reference and fastening spokes without any need of further and complex handling and positioning of the workpiece being worked.

The invention is further characterised in that the bar carrying the spindles for drilling, milling tools, or the like, is attached to the squaring machine by two brackets which are secured to the stands or uprights of the sliding frame carrying the aforesaid two pairs of blades.

The drilling bar can pivotally rotate about its longitudinal axis and be locked at the desired work angle; also the bar can be moved upwardly or downwardly by means of two rack axles sliding within guide hubs, one for each of the two support brackets.

Then, the whole drilling bar unit can evidently move to and from in conjunction with the sliding blade-holder frame, to which it is fixedly secured.

Figure 4:
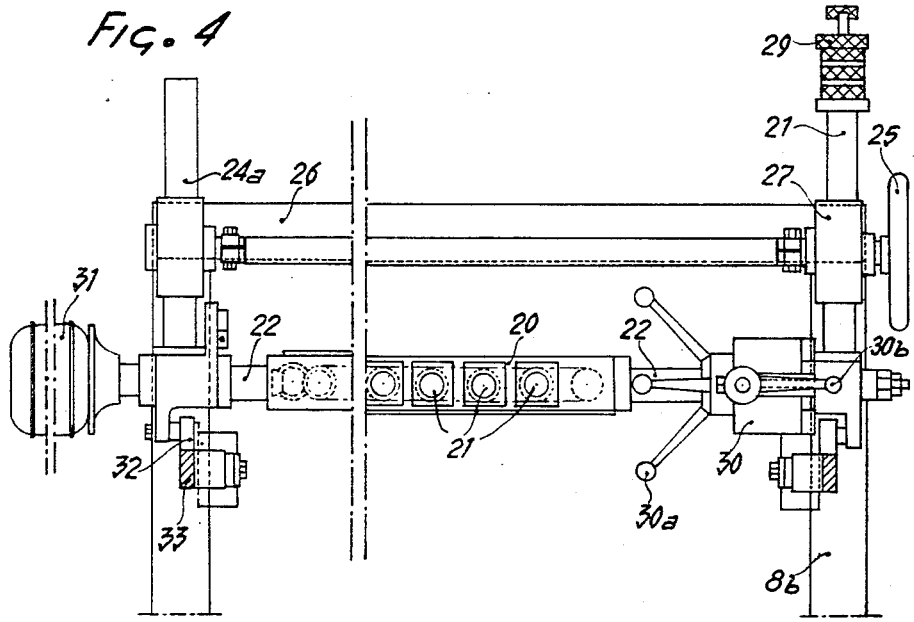
Figure 5:
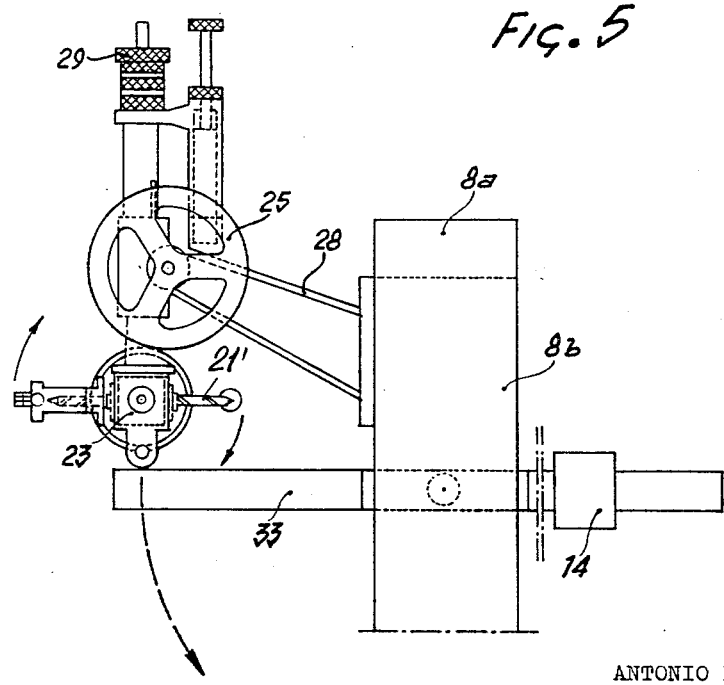

The accompanying drawing shows by way of example, and not of limitation, a preferred embodiment. In the drawing:

FIG. 1 is a perspective view of the machine as a whole.
FIG. 2 is a longitudinal elevational view without the multiple drilling unit.
FIG. 3 is a top view of the machine without the multiple drilling unit.
FIG. 4 is a front view of the drilling unit alone.
FIG. 5 is a side view of FIG. 4.

Referring to the drawings, it will be seen that the machine comprises a base 1 rigid with end uprights 1a; along the longitudinal sides of said base there are mounted two longitudinal rails 2, while uprights 1a carry a device for supporting the plate to be processed, the device comprising a longitudinal fixed beam 4 and a beam 4a, parallel thereto and slidably mounted on transverse support and guide rods 5 (FIG. 3), and associated with means 6 for locking at the preselected position, after having been moved to or away from the fixed beam 4. In combination, the beams 4 and 4a are designed to support the plate to be squared, and therefore the distance therebetween will be adjusted according to the width of said plate, which plate will have to project outwardly therefrom, so that the edge portions involved by the squaring cut and removed will be cantilevered with respect to the two beams 4 and 4a.

In order to clamp the plate to be squared, pneumatic devices 7 are located between the beams 4 and 4a, such devices being formed with vacuum operating valves which on application to the machine allow said plate to be fixedly clamped by grasping on the lower face thereof and at only the central area thereof, so that the edges projecting from the bearing beams, as well as the upper face of the plate as a whole, are entirely free for the passage of the working unit.

These devices 7 are of the resilient cup or valve type and are connected by at least partially flexible tubes 7a to a suction source (not shown) adapted to create a vacuum condition within said cups which will hold said plate as clamped at the preselected position. The devices 7 are associated with supporting means enabling the operator to vary the position of such devices both in height and horizontal, so as to accurately locate them at the most favorable spots for carrying out the squaring and drilling operations.

The longitudinally sliding working unit is supported by a frame 8, in the form of a portal or yoke, the legs 8b of which are provided with a carriage 16 movable along rails 2 on wheels.

Frame 8 may be caused to advance along rails 2 by a drive connected to at least one of said wheels and operated by a drive handle 9, means being provided for locking frame 8 at a preselected position with respect to base 1.

The machine illustrated is contemplated for a manual movement of said working unit, but no objection would arise in associating an apparatus with said unit for a mechanical operation thereof.

Frame 8 carries a pair of disc saws 10, 10a, the working planes of which are parallel to the vertical longitudinal plane of the machine, and a second pair of disc saws 11, 11a, the cut planes of which are vertical and parallel to one another and exactly perpendicular to the former cutting planes.

Disc saw 10 of the first pair is mounted at a fixed position with respect to frame 8, whereas the other disc saw 10a is mounted on transverse guides 12, so as to be moved toward or away from the twin saw 10 through a threaded axis operated by handle 9a, means being provided (not shown in the drawings) for locking the saw 10a at the preselected position. Saws 10, 10a and the pair of saws 11, 11a are associated with the operating motors 13, 13a, 14, respectively, which are provided with control means.

The second pair of saws 11, 11a, the working planes of which are perpendicular to the vertical longitudinal plane of the machine, are carried by a slide 15 mounted on the cross piece 8a of frame 8 and along which it may be caused to slide by grasping on a handle 17'.

The two disc blades 11, 11a are arranged respectively to the sides of the vertical plane passing through the axes of the other pair of rotating saws 10, 10a.

In turn, the multiple drilling machine is formed of a considerably extended angle-plate or prismatic box (bar 20), carrying a set of spindles 21 and being supported at the ends by two bored pins 22. The two pins 22 can rotate within two supports 23 and 23a carried by two vertical axes 24 and 24a, which in turn are capable of sliding within two guide hubs 27 by means of racks operated by a handwheel 25 and a coupling bar 26.

The two hubs 27 are incorporated in brackets 28 fixedly secured to the uprights 8a of frame 8, these brackets acting to support the assembly of the drilling unit and to combine it into a single machine together with the aforesaid squaring, supporting and clamping unit.

The vertical movement rack rod 24 is provided with a system of bushes and screws 29 for stroke regulation, whereas rotation for bar 20 about pins 22 is controlled by an index 30 which in the subject machine is of a four position type and is provided with levers 30a and locking systems 30b.

Movement of tool-holding spindles 21 is ensured by a chain mechanism (such as a roller chain) and gear mechanism, the whole being housed within said drilling bar 20 and operated by motor 31 through bored pin 22.

At the bottom, supports 23 and 23a have a cam-like extension, into which the axis of a ball bearing 32, one for each support, is horizontally fixed, which bearings will release the weight of the drilling machine on two rods during vertical movement operation, said two rods 33 being pivoted to the uprights 8b of frame 8 and held at a balanced condition by counter weight 34 in order to facilitate said operation by reducing the strains.

Operation of the squaring machine as combined with the multiple drilling machine is as follows:

At first, the distance between the two supporting beams 4, 4a is adjusted by fitting it to the width of the plate to be processed and at the same time the movable saw unit 10a is moved to bring it at a proper distance from the fixed saw 10, so that said two saws 10, 10a are capable of squaring the plate at the desired width.

Provision will also be made for end of stroke stops 19, securable at suitable positions with respect to rails 2, in order to adjust the stroke for the working unit in connection with the expected length of the plate to be squared.

The plate is then placed upon and suitably located on the supporting beams 4, 4a, after having adjusted the height and position for stop means 7 and, finally, such means 7 are made to communicate with the vacuum source; thereafter the plate is fixedly clamped with respect to base 1 of the machine.

Then the first cutting step is carried out by actuating the motor 14 which causes the saws 11, 11a to rotate, and by moving said movable assembly 15, carrying said saws, in a direction at right angles to the vertical longitudinal plane of the machine.

After having cut the first head-piece (the left-hand one according to the example proposed), assembly 15 is moved on one side of the frame, so that any further contact thereof with said plate is prevented, and then motors 13, 13a are actuated, such motors operating the other pair of rotating saws 10, 10a, whereas the unit is caused to slowly slide through the handlewheel 9 along rails 2 in order to accomplish the squaring for the longitudinal sides of the plate or panel.

At the end of the stroke, motors 13, 13a will be stopped and motor 14 for the pair of saws 11, 11a will be re-actuated. The assembly of said pair of saws 11, 11a is slowly driven along guide 8a so as to effect the other transverse cut (right-hand side). As apparent from the foregoing, saw 11 will be the operating saw, whereas the other will be the idle one. Therefore, the maximum length for the finished plate may be equal to the distance between the plane of saw 11a and that of saw 11, respectively at the positions of left-hand end of stroke and right-hand end of stroke of the working unit, as shown in FIG. 2.

Subsequently, but no objection would arise in arranging for the squaring operation to be omitted or postponed, while vertical and horizontal bores are formed, the plate or panel still remaining at the position in which it was clamped at the start of operations.

After mounting of the proper tools, such as 21', on the several spindles 21 of bar 20, frame 8 is moved along the longitudinal rails 2, locking it at the desired locations and usually adjacent the transverse edges (head-pieces). Then the tools are vertically positioned through operation of index 30 by means of levers 30a and block lever 30b, motor 31 is actuated and bar 20 is lowered by operating on handwheel 25.

By penetrating into the plate or panel, the tools pre-arranged according to the desired amount, will simultaneously produce all the vertical bores along the preselected transverse alignment, which bores may be of the through bore type, or limited to the depth as allowed by the stroke adjustment system 29. Should further vertical bores along other transverse alignments be required, the above-mentioned operations will have to be repeated, after having provided for moving frame 8 to the height of each desired alignment. Thus, whenever it is desired to alter the amount, quality or dimensions of the tools, it will of course be necessary to stop the motor 31.

For effecting horizontal bores, such an operation being possible only on the head-pieces of the plate or panel, frame 8 will be moved outwardly of one of the two head-pieces, the tools will be arranged at horizontal position by means of levers 30a and 30b, the level of the tools will be regulated, still by means of device 29, so that the axis thereof is at the same height as the axis of the bore to be made, and motor 31 will be actuated.

The so pre-arranged horizontal bore or bores will be made by driving or causing frame 8 to advance to the headpiece, that is to the desired depth which cannot be greater than the tool length and which may be also adjusted by the adjustment and stop means 19. In the case, the same operation is to be repeated on the opposite headpiece, or should it be desired to effect bore alignments in the same headpiece at different levels.

What is claimed is:

1. A machine for squaring panels, comprising:
   a fixed base;
   a support frame mounted on said base and adapted to carry a panel to be processed, said frame including a fixed longitudinal beam, an adjustable longitudinal beam and means enabling displacement of said adjustable beam relative to said fixed beam in a direction transverse to said beams;
   pneumatic means including suction members between said beams for engagement with the underside of a panel positioned on said beams for clamping said panel during a working cycle of the machine;
   a longitudinally shiftable working-tool unit on said base, said unit including a first pair of spaced-apart saws lying in planes parallel to the vertical longitudinal plane of the machine and externally of said frame for all positions thereof, a second pair of spaced-apart saws having rotatable blades lying in vertical planes at right angles to the planes of said first pair of saws, a transverse guide device slidably carrying said second pair of saws, and a tool-carrying frame movable longitudinally along said base and carrying said second pair of saws and said guide device, said tool-carrying frame having a pair of uprights on opposite sides of said beams;
   respective brackets fixed to said uprights and provided with respective rack rods vertically shiftable in said brackets;
   means for adjusting said rods vertically;
   a drilling bar carried by said rods and vertically shiftable thereby while provided with a set of tool-holding spindles rotatable about respective vertical axes, said bar having end pins including at least one hollow end pin enabling connecting of said spindle to a driving device, said pins being rotatable in respective supports formed by said rods; and
   a locking and indexing device provided at one of said pins for angularly positioning said bar.

2. The machine as defined in claim 1 wherein said tool-carrying frame is a portal frame having legs formed with carriages, said base being provided with longitudinal rails supporting said carriages while enabling displacement thereof longitudinally of the support frame.

3. The machine as defined in claim 1 wherein at least one of the saws of the first pair is engageably mounted on said support frame and has a working plane parallel to the vertical longitudinal plane of said machine.

4. The machine as defined in claim 1 wherein said tool-carrying frame has a crosspiece spanning said uprights and of a length greater than the maximum width of the panel to be processed.

5. The machine defined in claim 1 wherein the supports in which said pins are rotatable comprise cam-like extensions receiving respective ball-bearing axes and fixing same horizontally, said unit being provided further with respective counterbalanced levers pivoted on said uprights and acting upon said ball bearings.

6. The machine defined in claim 1 wherein said rack rods are provided with rabbet or shoulder adjusting devices.

References Cited

UNITED STATES PATENTS

| | | | |
|---|---|---|---|
| 853,908 | 5/1907 | Swintek | 144—35 |
| 2,789,598 | 4/1957 | Berger | 144—35 |
| 3,388,727 | 6/1968 | Kotila | 144—1 |

GERALD A. DOST, Primary Examiner